(12) United States Patent
Harrison

(10) Patent No.: US 10,138,946 B2
(45) Date of Patent: Nov. 27, 2018

(54) SYSTEM AND METHOD FOR APPLYING A TENSILE LOAD TO A COMPONENT, HAVING A MECHANICAL FUSE

(71) Applicant: ROLLS-ROYCE PLC, London (GB)

(72) Inventor: John Michael Harrison, Bristol (GB)

(73) Assignee: ROLLS-ROYCE plc, London (GB)

( * ) Notice: Subject to any disclaimer, the term of this patent is extended or adjusted under 35 U.S.C. 154(b) by 547 days.

(21) Appl. No.: 15/015,778

(22) Filed: Feb. 4, 2016

(65) Prior Publication Data

US 2016/0258491 A1 Sep. 8, 2016

(30) Foreign Application Priority Data

Mar. 3, 2015 (GB) .................................. 1503560.3

(51) Int. Cl.
| | | |
|---|---|---|
| *F01D 5/02* | (2006.01) | |
| *F16D 9/04* | (2006.01) | |
| *F01D 21/00* | (2006.01) | |
| *G01M 1/04* | (2006.01) | |

(52) U.S. Cl.
CPC ............... *F16D 9/04* (2013.01); *F01D 5/027* (2013.01); *F01D 21/003* (2013.01); *G01M 1/04* (2013.01); *F05D 2250/185* (2013.01)

(58) Field of Classification Search
CPC ... F16D 9/04; F16D 9/00; F01D 5/027; F05D 2250/185
See application file for complete search history.

(56) References Cited

U.S. PATENT DOCUMENTS

| | | | | |
|---|---|---|---|---|
| 2,249,848 A | * | 7/1941 | O'Brien | .................... E03B 9/02 137/272 |
| 4,463,777 A | * | 8/1984 | Taniguthi | .................. F16D 9/08 137/553 |
| 4,549,569 A | * | 10/1985 | Taylor | .................... F16K 35/06 137/382.5 |
| 5,544,675 A | * | 8/1996 | Dean | .................... F16K 31/602 137/797 |
| 2011/0110705 A1 | | 5/2011 | Soulier et al. | |
| 2015/0056001 A1 | | 2/2015 | Messenger et al. | |

FOREIGN PATENT DOCUMENTS

GB          2090648 A     7/1982

OTHER PUBLICATIONS

Aug. 29, 2015 Great Britain Search Report issued in Great Britain Patent Application No. 1503560.3.

* cited by examiner

*Primary Examiner* — Jonathan P Masinick
(74) *Attorney, Agent, or Firm* — Oliff PLC

(57) ABSTRACT

A system for applying a tensile load to a component includes a failsafe structure, a principal part of which is configured to act in compression during application of the load to the component, but which includes a mechanical fuse configured to act in tension during application of the load to the component. The mechanical fuse being configured to fracture upon the application of a predetermined tensile force thereto.

16 Claims, 4 Drawing Sheets

SYSTEM AND METHOD FOR APPLYING A TENSILE LOAD TO A COMPONENT, HAVING A MECHANICAL FUSE

This disclosure claims the benefit of UK Patent Application No. GB1503560.3, filed on 3 Mar. 2015, which is hereby incorporated herein in its entirety.

The present disclosure relates to a system for applying a tensile load to a component, and also relates to a method involving the use of the system.

There are many circumstances in which it is necessary to apply a tensile load to a component such as a shaft or a tie-bolt. One example, which is not to be considered limiting to the scope of the present disclosure, involves mounting a rotor (such as a compressor rotor or a turbine rotor) of a gas turbine engine to a balance simulator, for example during assembly of the rotor. In this type of situation it is known to support the rotor on a shaft which extends outwardly from the balance simulator, through the rotor, and which is bolted to a compression unit adjacent the rotor. The shaft is subjected to a high tensile load between the compression unit and the balance simulator in order to secure the rotor in position therebetween. However, it has been found that the processes of applying the tensile load to the shaft, which can be achieved via a hydraulic arrangement, can involve a risk of component failure due to the high forces involved. In some circumstances, it has been found that such component failure can result in parts of the aforementioned assembly being forcibly released which represents a safety risk for operatives working in the area of the assembly. It is therefore considered advantageous to provide a system for the application of the tensile load which includes a failsafe arrangement in order to reduce such risk.

It is a first object of the present disclosure to provide an improved system for applying a tensile load to a component. It is a second object of the present disclosure to provide a related method of applying a tensile load to a component.

Whilst the system disclosed herein is provided with specific reference to a system for applying a tensile load to a shaft in order to mount a gas turbine engine rotor to a balance simulator in the general manner mentioned above, it is to be appreciated that the disclosure is not limited to this particular use, and could instead be embodied in other systems and methods for applying tensile loads to components.

According to a first aspect of the present disclosure, there is provided a system for applying a tensile load to a component, the system including a failsafe structure, a principal part of which is configured to act in compression during application of said load to the component, but which includes a mechanical fuse configured to act in tension during application of said load to the component, the mechanical fuse being configured to fracture upon the application of a predetermined tensile force thereto.

Optionally, said mechanical fuse is formed as an integral part of said failsafe structure.

Optionally, said structure is unitary.

Optionally, said principal part of the structure comprises a pair of annular sidewalls arranged to extend around an axis along which said tensile load is applied to the component during use of the system, said sidewalls being radially spaced from one another and interconnected via said fuse.

Optionally, said interconnection between said sidewalls and said fuse forms a serpentine configuration in radial cross-section.

Optionally, said fuse is substantially annular and is arranged so as to extend around said axis.

Optionally, said fuse is configured so as to be substantially coaxial with said axis and said sidewalls.

Optionally, said structure is configured to collapse in a manner involving relative axial movement between said sidewalls upon fracture of said fuse.

Optionally, said fuse has a radial thickness which is less than the radial thickness of each said sidewall.

Optionally, the system includes a hydraulic arrangement to apply said tensile load to the component.

Optionally, said failsafe structure is located between said component and said hydraulic arrangement.

Optionally, said hydraulic arrangement includes a piston actuable to move inside a chamber and thereby apply said tensile load to the component.

Optionally, said hydraulic arrangement is mounted against said failsafe structure.

According to a second aspect of the present disclosure, there is provided a method of applying a tensile load to a component, the method involving the use of a system according to the first aspect.

Optionally, said component is an elongate shaft.

Optionally, said component is used to mount a gas turbine engine rotor to a balance simulator.

So that the disclosure may be more readily understood, and so that further features thereof may be appreciated, embodiments of the disclosure will now be described by way of example with reference to the accompanying drawings in which.

Figure 1:
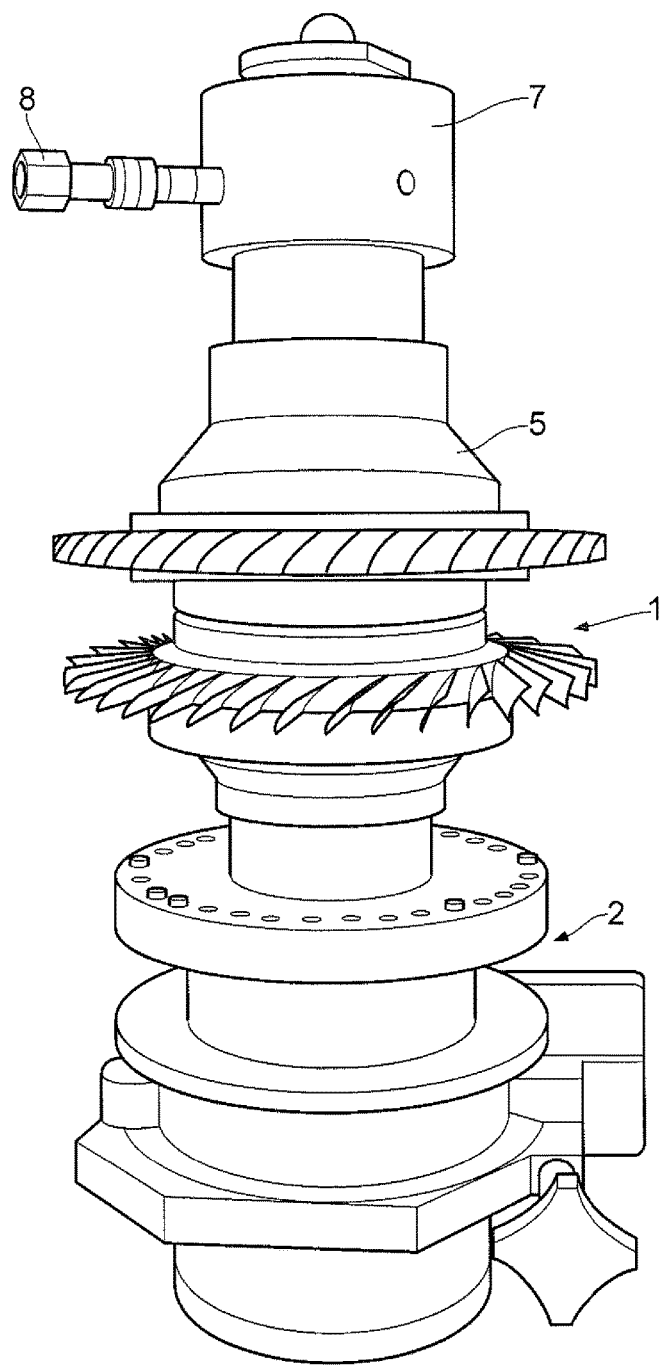
FIG. 1 is a perspective illustration showing a compressor rotor mounted to a balance simulator, in combination with a with a hydraulic system.
Figure 2:
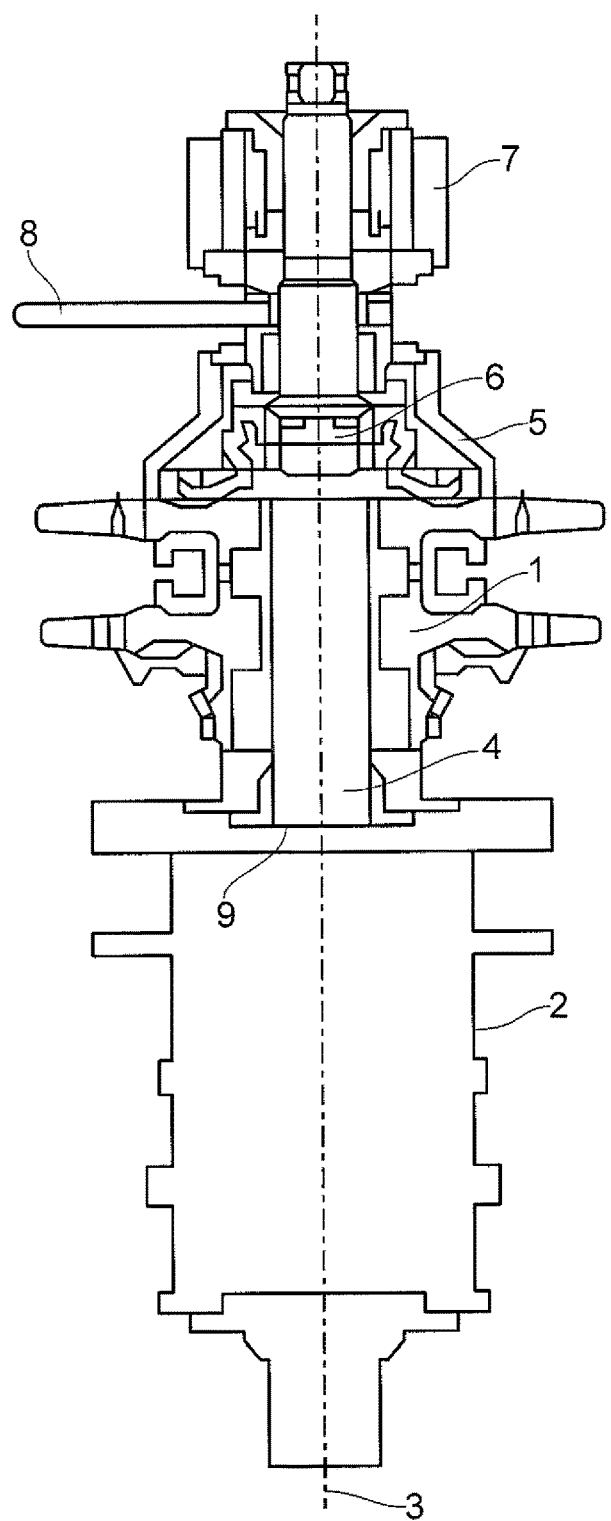
FIG. 2 is a schematic cross-sectional view taken through the arrangement of FIG. 1.

Turning now to consider the drawings in more detail, FIGS. 1 and 2 illustrate a gas turbine engine rotor 1 mounted to a balance simulator 2. The rotor 1 may take the form of a compressor rotor, or a turbine rotor.

As illustrated most clearly in FIG. 2, the rotor 1 is mounted co-axially with the balance simulator 2 for co-rotation with the balance simulator about a longitudinal axis 3. More particularly, the rotor 1 is mounted to a shaft 4 which extends (vertically in the orientation illustrated) outwardly from the balance simulator 2 along the axis 3. The rotor 1 is mounted so as to axially abut the balance simulator 2, and is clamped tightly between the balance simulator 2 and a compression unit 5 which is tightly connected to the shaft 4 via a nut 6.

In order to ensure that the rotor 1 is securely clamped between the balance simulator 2 and the compression unit 5, a large tensile load is applied to the shaft 4 prior to the compression unit 5 being connected to the shaft 4 via the nut 6, thereby effectively stretching the shaft 4. This is achieved by using a hydraulic arrangement 7 which is arranged so as to bear against the compression unit 5 and which is actuable, via a supply of hydraulic fluid which is flowed into the arrangement via an inlet duct 8, in order to apply the necessary tensile load to the shaft 4. When the appropriate load is applied to the shaft 4 the compression unit 5 is secured to the shaft 4 by tightening the nut 6, after which the hydraulic arrangement 7 can be removed, leaving the rotor 1 tightly clamped between the balance unit 2 and the compression unit 5.

However, as indicated above, the tensile load which is required to be applied to the shaft 4 in this type of assembly is very high, and sometimes defects in the shaft 4 or other components can result in failure of the assembly, particularly during the process of applying the tensile load to the shaft 4 before the compression unit 5 is secured to the shaft 4. For example, instances have been experienced where such a failure has occurred in the shaft 4 at a position indicated schematically at 9 in FIG. 2, where the rotor 1 abuts the balance unit 2. Because the load applied to the shaft 4 is tensile, this type of failure results in all of the hardware above (in the orientation illustrated) the failure site becoming released. This can be very dangerous to people working in the vicinity of the assembly.

Figure 3:
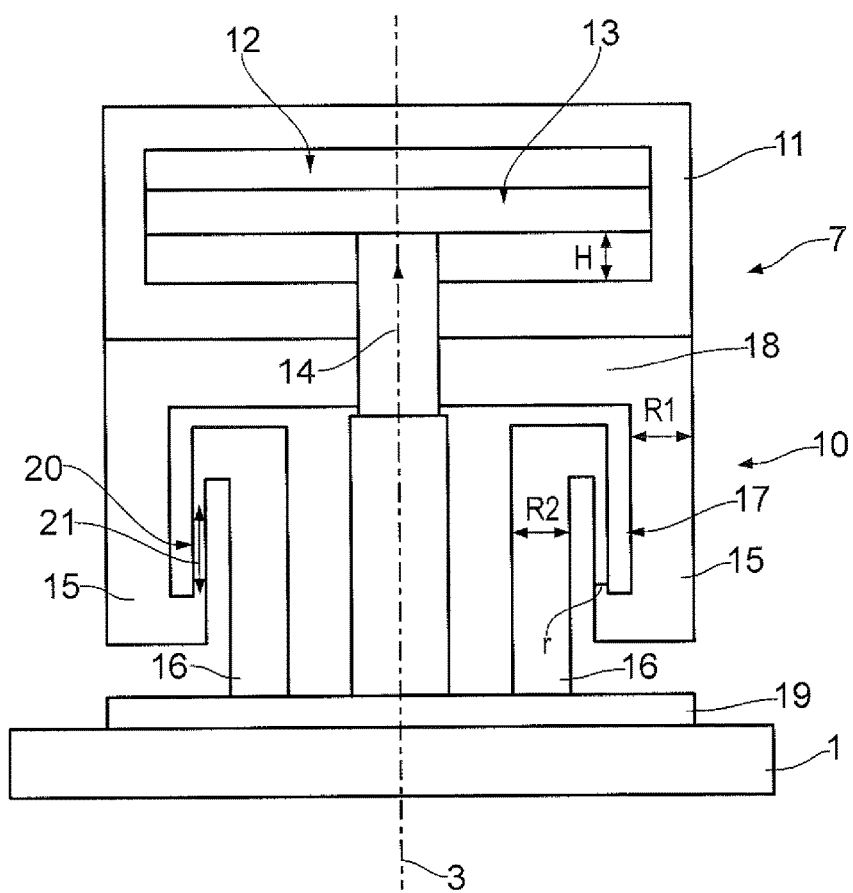
FIG. 3 is a schematic cross-sectional view taken through a failsafe structure in accordance with an embodiment of the disclosure, showing the structure in a normal condition.

Turning now to consider FIG. 3, there is illustrated part of a system for applying a tensile load to a component such as the shaft 4 in the arrangement illustrated in FIGS. 1 and 2. In particular, there is illustrated a failsafe structure 11 in combination with a hydraulic arrangement 7 similar to the hydraulic arrangement illustrated in FIGS. 1 and 2. As will become apparent, the failsafe structure 10 is configured and arranged to perform a similar function to the compression unit 5 of FIGS. 1 and 2, and is thus arranged to act principally in compression as the hydraulic arrangement 7 is actuated to apply a tensile load to the shaft 4. The failsafe structure 10 is thus illustrated in FIG. 3 in a position in which it is located axially between the upper end of the rotor 1 and the hydraulic arrangement 7, with the shaft 4 extending therethrough.

The hydraulic arrangement 7 comprises a housing 11 which defines an internal chamber 12 in the form of a cylinder. A piston 13 is arranged for axial movement (denoted by arrow 14) within the chamber 12. As will be appreciated, the piston 13 will be actuated to move upwardly (in the orientation illustrated) and thereby apply a tensile load to the shaft 4, effectively stretching the shaft. This will therefore involve the creation of a large hydraulic pressure H between the piston 13 and the housing 11 of the hydraulic arrangement 7. The resulting force will thus place the failsafe structure 10 in compression.

The failsafe structure 10 will typically be formed from high strength metal such as steel, and is shown in a unitary and generally annular configuration in which it extends around the axis 3 and the shaft 4 in coaxial relationship. In more detail, the structure 10 comprises a pair of coaxial annular side walls 15, 16 which are arranged to extend around the axis 3. The radially outermost sidewall 15 is spaced from the radially innermost sidewall 16, but is connected thereto by a region 17 of the structure having a generally serpentine configuration in radial cross-section, as illustrated clearly in FIG. 3. The serpentine region 17 is formed as an integral part of the failsafe structure 10.

The serpentine region 17 of the failsafe structure 10, which interconnects the outer and inner sidewalls 15, 16 is configured such that the inner sidewall 16 is axially spaced from an upper (in the orientation illustrated) end wall 18 of the structure 10 abutting the housing 11 of the hydraulic arrangement 7, and such that the outer sidewall 15 is axially spaced from a lower (in the orientation illustrated) end wall 19 of the structure abutting the rotor 1.

The serpentine region 17 of the failsafe structure 10 includes an annular section 20 which is coaxial with the axis 3 and the sidewalls 15, 16, and is located between the two sidewalls 15, 16 so as to be spaced radially from each. As will be noted, the annular section 20 of the serpentine region 17 has a radial thickness r which is significantly less than the radial thickness $R_1$, $R_2$ of each sidewall (which may optionally be equal to one another).

The above-described configuration and arrangement of the failsafe structure 10 means that the principal part of the structure 10, comprising the sidewalls 15, 16 and the end walls 18, 19, will act in axial compression between the hydraulic arrangement 7 and the rotor 1 as the piston 13 is actuated to apply the tensile load to the shaft 4. However, because of the serpentine configuration of the region 17 interconnecting the sidewalls 15, 16, the annular section 20 is arranged to act in tension under as the tensile load is applied to the shaft 4 by the hydraulic arrangement 7, as denoted by arrow 21 in FIG. 3.

The annular section 20 is configured to fracture upon the application of a predetermined threshold tensile force thereto, and can thus be considered to define a mechanical safety fuse. By carefully selecting the predetermined threshold force at which the annular section 20 will fracture, the resulting fuse can be configured to fracture in preference to other components of the assembly, such as the shaft 4 itself, in a controlled manner.

The above-described configuration in which the fuse section 20 is arranged to act in tension during the application of a tensile load to the shaft 4, but in which the other principal parts of the failsafe structure 10 are arranged to act in compression offers significant advantages. Firstly, the fuse section 20 can be accurately configured to fracture at a predetermined tensile load because it is generally easier to predict the failure of parts or components in tension than in compression.

Figure 4:
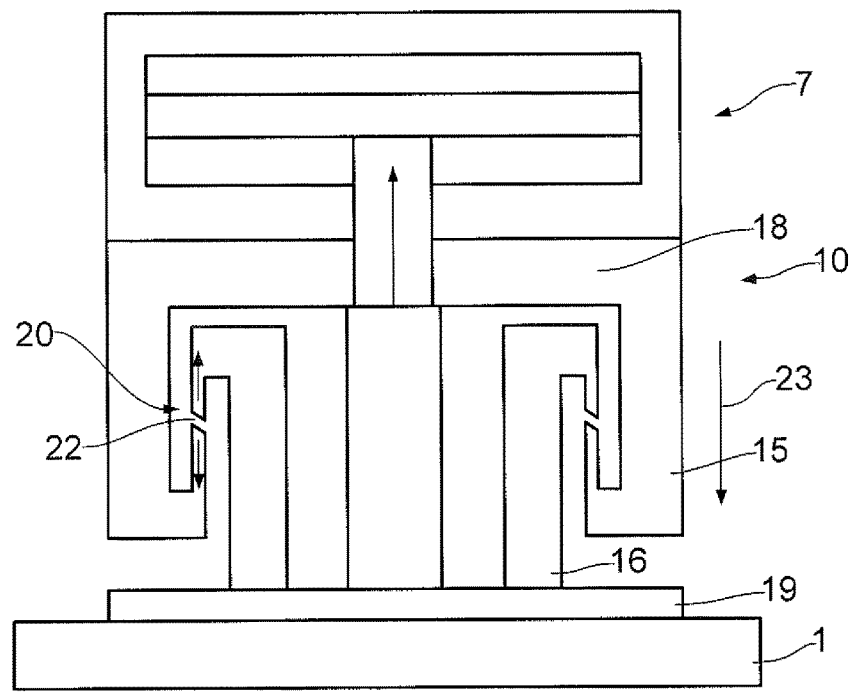
FIG. 4 is a schematic illustration similar to that of FIG. 3, but which shows the failsafe structure in an alternate condition.

FIG. 4 illustrates the failsafe structure 10 following fracture of the fuse section 20, the fracture being illustrated at 22. As will be noted, because the principal parts of the failsafe structure 10 such as the end walls 18, 19 and the sidewalls 15, 16 act in compression during the application of the tensile load to the shaft 4 by the hydraulic arrangement 7, fracture of the fuse section 20 is effective to permit the failsafe structure to collapse axially, as denoted by arrow 23 in FIG. 4, such that the sidewalls 15, 16 move axially relative to one another. This axial collapse of the structure 10 is permitted because the manner in which the inner sidewall 16 is axially spaced from the upper end wall 18 of the structure 10 abutting the housing 11 of the hydraulic arrangement 7, and in which the outer sidewall 15 is axially spaced from the lower end wall 19 of the structure abutting the rotor 1. Axial collapse of the failsafe structure 10 under compression in this manner is considered to be significantly safer than if the arrangement were to pull apart under tension. As will also be noted, because the fuse section 20 of the failsafe structure 10 is located radially inwardly of the outer sidewall 15, any fragments arising from fracture of the fuse section 20 will be substantially contained within the structure, thereby reducing the risk of them be forcibly ejected from the arrangement as projectiles.

When used in this specification and claims, the terms "comprises" and "comprising" and variations thereof mean that the specified features, steps or integers are included. The terms are not to be interpreted to exclude the presence of other features, steps or integers.

The features disclosed in the foregoing description, or in the following claims, or in the accompanying drawings, expressed in their specific forms or in terms of a means for performing the disclosed function, or a method or process for obtaining the disclosed results, as appropriate, may, separately, or in any combination of such features, be utilised for realising the invention in diverse forms thereof.

While the disclosure has been described in conjunction with the exemplary embodiments described above, many equivalent modifications and variations will be apparent to those skilled in the art when given this disclosure. Accordingly, the exemplary embodiments of the disclosure set forth above are considered to be illustrative and not limiting. Various changes to the described embodiments may be made without departing from the spirit and scope of the disclosure.

What is claimed is:

1. A system for applying a tensile load to a component, the system including a failsafe structure, a principal part of which is configured to act in compression during application of said load to the component, but which includes a mechanical fuse configured to act in tension during application of said load to the component, the mechanical fuse being configured to fracture upon the application of a predetermined tensile force thereto.

2. The system according to claim 1, wherein said mechanical fuse is formed as an integral part of said failsafe structure.

3. The system according to claim 1, wherein said structure is unitary.

4. The system according to claim 1, wherein said principal part of the structure comprises a pair of annular sidewalls arranged to extend around an axis along which said tensile load is applied to the component during use of the system, said sidewalls being radially spaced from one another and interconnected via said fuse.

5. The system according to claim 4, wherein said interconnection between said sidewalls and said fuse forms a serpentine configuration in radial cross-section.

6. The system according to claim 4, wherein said fuse is substantially annular and is arranged so as to extend around said axis.

7. The system according to claim 6, wherein said fuse is configured so as to be substantially coaxial with said axis and said sidewalls.

8. The system according to claim 4, wherein said structure is configured to collapse in a manner involving relative axial movement between said sidewalls upon fracture of said fuse.

9. The system according to claim 4, wherein said fuse has a radial thickness which is less than the radial thickness each said sidewall.

10. The system according to claim 1, the system including a hydraulic arrangement to apply said tensile load to the component.

11. The system according to claim 10, wherein said failsafe structure is located between said component and said hydraulic arrangement.

12. The system according to claim 10, wherein said hydraulic arrangement includes a piston actuable to move inside a chamber and thereby apply said tensile load to the component.

13. The system according to claim 10, wherein said hydraulic arrangement is mounted against said failsafe structure.

14. A method of applying a tensile load to a component, the method involving the use of a system according to claim 1.

15. The method according to claim 14, wherein said component is an elongate shaft.

16. The method according to claim 14, wherein said component is used to mount a gas turbine engine rotor to a balance simulator.

* * * * *